United States Patent
Akatsu et al.

(10) Patent No.: US 10,707,784 B2
(45) Date of Patent: Jul. 7, 2020

(54) PIEZOELECTRIC DRIVING DEVICE, OPTICAL MEMBER DRIVING DEVICE, CAMERA DEVICE, AND ELECTRONIC APPARATUS

(71) Applicant: New Shicoh Motor Co., Ltd., Zhejiang (CN)

(72) Inventors: Masahiro Akatsu, Kanagawa (JP); Kei Onodera, Kanagawa (JP)

(73) Assignee: New Shicoh Motor Co., Ltd., Zhejiang (CN)

( * ) Notice: Subject to any disclaimer, the term of this patent is extended or adjusted under 35 U.S.C. 154(b) by 65 days.

(21) Appl. No.: 16/199,768

(22) Filed: Nov. 26, 2018

(65) Prior Publication Data
US 2019/0207535 A1    Jul. 4, 2019

(30) Foreign Application Priority Data

Dec. 28, 2017 (JP) ................... 2017-252885
Oct. 5, 2018 (JP) ................... 2018-189716

(51) Int. Cl.
*H02N 2/02* (2006.01)
*H02N 2/06* (2006.01)
(Continued)

(52) U.S. Cl.
CPC ............ *H02N 2/028* (2013.01); *G03B 5/04* (2013.01); *H02N 2/026* (2013.01); *H02N 2/067* (2013.01);
(Continued)

(58) Field of Classification Search
CPC ........ H02N 2/028; H02N 2/026; H02N 2/067; G03B 5/04; H04N 5/2257; H04N 5/23287
See application file for complete search history.

(56) References Cited

U.S. PATENT DOCUMENTS 7,786,648 B2 *  8/2010  Xu ................. H02N 2/0015
                                                    310/317
9,429,749 B2 *  8/2016  Kawai ............ G02B 27/0006
(Continued)

FOREIGN PATENT DOCUMENTS

JP    H06-178564    6/1994
JP    H08-149863    6/1996
(Continued)

OTHER PUBLICATIONS

Office Action issued in corresponding Japanese Patent Application No. 2018-189716, dated Nov. 25, 2019, and English translation.
(Continued)

*Primary Examiner* — Nicholas G Giles
(74) *Attorney, Agent, or Firm* — Fildes & Outland, P.C.

(57) ABSTRACT

Provided are a piezoelectric driving device, an optical member driving device, a camera device, and an electronic apparatus, which are capable of performing driving only by one-direction oscillation modes, and capable of combining the oscillation modes to enable driving in two directions. A piezoelectric driving device (10) includes: a driving portion (12) to be brought into frictional contact with an object to be driven; and two piezoelectric portions (14a, 14b) (14c, 14d), which are provided to the driving portion (12), are arranged on a plane with the driving portion (12) being sandwiched between the two piezoelectric portions, and are configured to be bent with respect to the plane when voltages are applied thereto. Further, a piezoelectric driving device (10) includes: a driving portion (12) to be brought into frictional contact with an object to be driven; and at least four piezoelectric portions (14a to 14d), which are fixed to the driving portion (12), are arranged in a circulated manner on a plane and around the driving portion (12), and are con-
(Continued)

figured to be bent with respect to the plane when voltages are applied thereto.

17 Claims, 12 Drawing Sheets

(51) Int. Cl.
 *H04N 5/232* (2006.01)
 *G03B 5/04* (2006.01)
 *H04N 5/225* (2006.01)

(52) U.S. Cl.
 CPC ....... *H04N 5/2257* (2013.01); *H04N 5/23287* (2013.01); *G03B 2205/0015* (2013.01); *G03B 2205/0061* (2013.01)

(56) References Cited

U.S. PATENT DOCUMENTS

| 2003/0067544 A1* | 4/2003 | Wada ..................... G03B 5/00 348/208.7 |
| 2007/0182281 A1 | 8/2007 | Mori |
| 2010/0038996 A1* | 2/2010 | Xu ....................... H02N 2/0015 310/323.16 |
| 2012/0026613 A1 | 2/2012 | Suzuki et al. |
| 2014/0185140 A1* | 7/2014 | Kawai ................ G02B 27/0006 359/508 |

FOREIGN PATENT DOCUMENTS

| JP | 2005-237144 | 9/2005 |
| JP | 2007-185056 | 7/2007 |
| JP | 4261964 | 2/2009 |
| WO | 2010/109825 | 9/2010 |

OTHER PUBLICATIONS

English language machine translation of JP H06-178564.
English language machine translation of JP H08-149863.
English language machine translation of JP 2005-237144.
English language machine translation of JP 4261964.

* cited by examiner

| driving direction | electrode portion | | | |
|---|---|---|---|---|
| | V1 | V2 | V3 | V4 |
| X direction | 0° (90°) | | 90° (0°) | |
| Y direction | 0° (90°) | 90° (0°) | | 0° (90°) |

PIEZOELECTRIC DRIVING DEVICE, OPTICAL MEMBER DRIVING DEVICE, CAMERA DEVICE, AND ELECTRONIC APPARATUS

BACKGROUND OF THE INVENTION

1. Field of the Invention

The present invention relates to a piezoelectric driving device, an optical member driving device, a camera device, and an electronic apparatus.

2. Description of the Related Art

As a related-art piezoelectric driving device, for example, as described in Japanese Patent No. 4261564, there has been known a piezoelectric driving device, which includes a plurality of divided piezoelectric elements arranged in a planar manner, and is configured to perform driving by applying a voltage to each of the piezoelectric elements.

However, the above-mentioned related-art piezoelectric driving device is configured to drive an object to be driven in one axial direction by combining an oscillation mode in an X-axis direction and an oscillation mode in a Y-axis direction, which is orthogonal to the X-axis direction. Therefore, there has been a problem in that driving is possible only in one direction.

SUMMARY OF THE INVENTION

The present invention has been made to solve the above-mentioned problem in the related art, and has an object to provide a piezoelectric driving device, an optical member driving device, a camera device, and an electronic apparatus, which are capable of performing driving only by one-direction oscillation modes, and capable of combining the oscillation modes to enable driving in two directions.

According to one embodiment of the present invention, there is provided a piezoelectric driving device including: a driving portion to be brought into frictional contact with an object to be driven; and at least two piezoelectric portions, which are provided to the driving portion, are arranged on a plane with the driving portion being sandwiched between the at least two piezoelectric portions, and are configured to be bent with respect to the plane when voltages are applied to the at least two piezoelectric portions. According to another embodiment of the present invention, the at least two piezoelectric portions are four piezoelectric portions, which are arranged in a circulated manner on the plane and around the driving portion.

According to one or more embodiments of the present invention, the driving portion is configured to be inclined in a reciprocating manner along a direction in which the two piezoelectric portions are arranged, and has different inclination speeds between a forward path and a return path. Further, the two or four piezoelectric portions include a plate-like piezoelectric element, a plate-like elastic member fixed to one surface of the plate-like piezoelectric element, and an electrode fixed to another surface of the plate-like piezoelectric element on an opposite side to the one surface, and the electrode is divided into one of two electrodes and four electrodes. The plate-like piezoelectric element may be divided so as to correspond to the divided electrode. Further, the plate-like elastic member may also be divided so as to correspond to the divided plate-like piezoelectric element and the divided electrode.

Further, according to one or more embodiments of the present invention, the piezoelectric driving device further includes a controller configured to control driving of the two or four piezoelectric portions by applying pulse voltages to the two or four piezoelectric portions. The controller is configured to control a phase difference or duty ratio of the pulse voltages to be applied to the two or four piezoelectric portions.

When the driving is to be performed in two XY directions, two piezoelectric portions are arranged in each of the X direction and the Y direction. In this case, when the object to be driven is to be moved in the X direction, pulse voltages are applied with a phase difference to two pairs each including the two of the four piezoelectric portions arranged in the Y direction, and, when the object to be driven is to be moved in the Y direction, the pulse voltages are applied with the phase difference to two pairs each including the two of the four piezoelectric portions arranged in the X direction. When movement of the object to be driven is switched between a positive direction and a negative direction of one of the X direction and the Y direction, the phase difference or duty ratio of the pulse voltages to be applied to the two or four piezoelectric portions is switched.

According to still another embodiment of the present invention, there is provided an optical member driving device, in which the object to be driven is an optical member.

Further, according to still another embodiment of the present invention, there is provided a camera device including the above-mentioned optical member driving device.

Further, according to still another embodiment of the present invention, there is provided an electronic apparatus including the above-mentioned camera device.

According to the embodiments of the present invention, there are arranged the at least two piezoelectric portions, which are arranged on a plane with the driving portion being sandwiched therebetween, and are configured to be bent with respect to the plane when voltages are applied thereto. Therefore, the object to be driven in frictional contact with the driving portion can be driven only by the one-direction oscillation mode. Further, the four piezoelectric portions are arranged in a circulated manner on a plane and around the driving portion, and hence the object to be driven in frictional contact with the driving portion can be driven in two directions.

DESCRIPTION OF THE EMBODIMENTS

Embodiments of the present invention are now described referring to the accompanying drawings.

Figure 1:
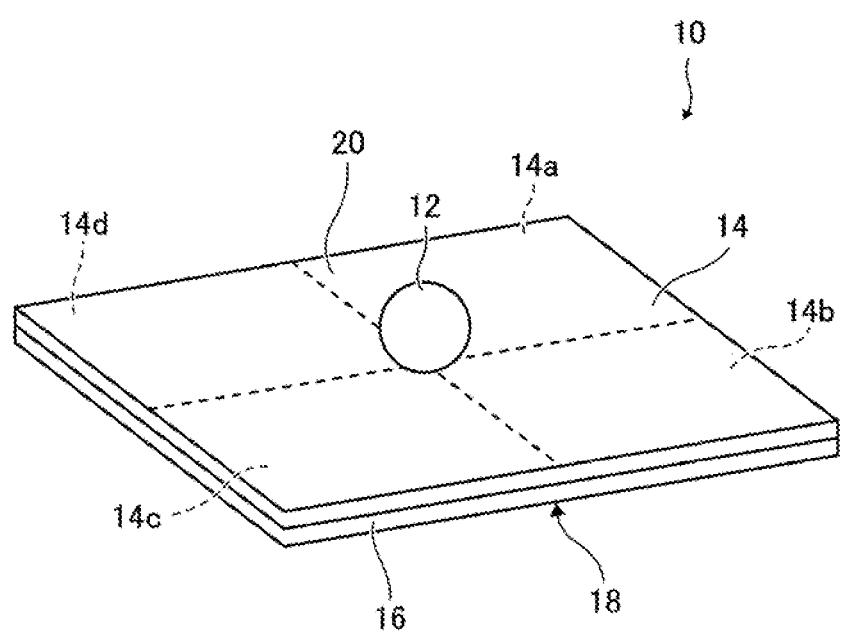
FIG. 1 is a perspective view for illustrating a piezoelectric driving device according to a first embodiment of the present invention.
Figure 2:
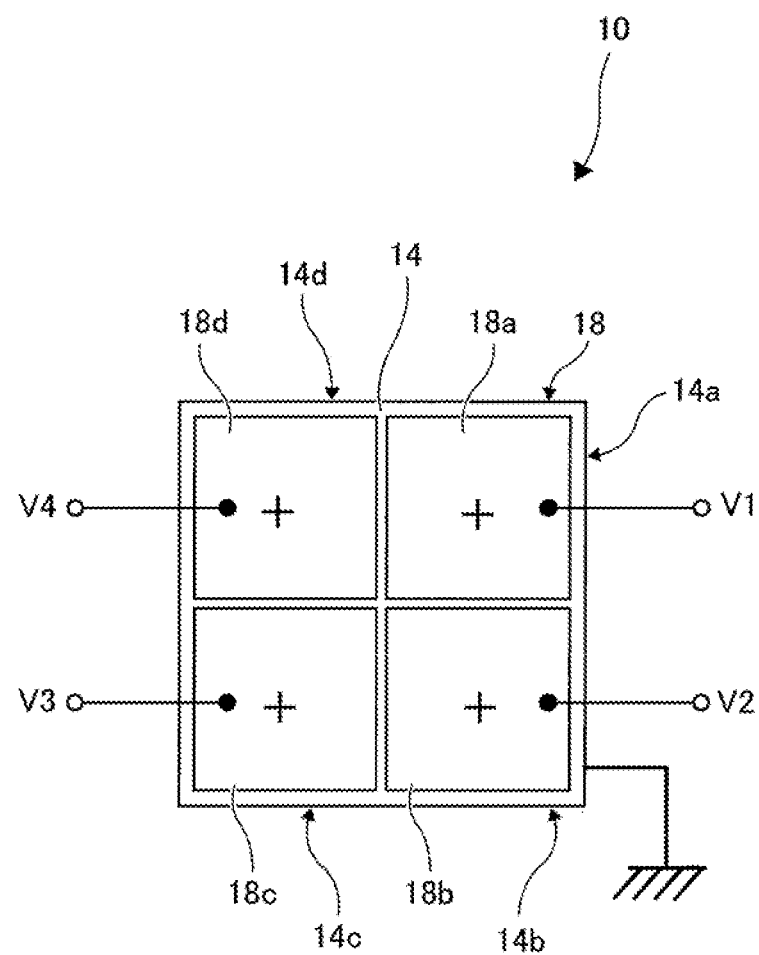
FIG. 2 is a plan view for illustrating the piezoelectric driving device according to the first embodiment of the present invention.

FIG. 1 and FIG. 2 are illustrations of a piezoelectric driving device 10 according to a first embodiment of the present invention.

In the piezoelectric driving device 10, a driving portion 12 is arranged at a center of a piezoelectric portion 14. The driving portion 12 has, for example, a sphere shape, and has an appropriate friction coefficient. Further, the driving portion 12 is made of a material having abrasion resistance. An upper end of the driving portion 12 is to be brought into frictional contact with an object 32 to be driven, which is described later.

Further, the piezoelectric portion 14 includes a plate-like piezoelectric element 16, a plate-like elastic member 20 fixed to one surface of the plate-like piezoelectric element 16, and an electrode 18 fixed to another surface of the piezoelectric element 16 on the opposite side to the one surface. As illustrated in FIG. 2, the electrode 18 is divided into, for example, four electrode portions 18a to 18d, and the piezoelectric portion 14 also includes four piezoelectric portions 14a to 14d so as to correspond to the electrode portions 18a to 18d, respectively. The electrode portions 18a to 18d (piezoelectric portions 14a to 14d) are each formed into a square shape, and are arranged in a circulated manner on a plane and around the driving portion 12.

The piezoelectric element 16 is made of a piezoelectric ceramic or other materials, and the electrode 18 is made of copper, a copper alloy, or other materials. The piezoelectric element 16 is made of a piezoelectric material, but the material may be replaced with a material having an electrostrictive effect.

As illustrated in FIG. 2, when a direction of one side is represented by an X direction, and a direction of another side orthogonal to the one side is represented by a Y direction, a first pair including two piezoelectric portions 14a and 14d arranged in the X direction and a second pair including two piezoelectric portions 14b and 14c arranged in the X direction are arranged in the Y direction. Meanwhile, as viewed in the Y direction, a first pair including two piezoelectric portions 14a and 14b arranged in the Y direction and a second pair including two piezoelectric portions 14c and 14d arranged in the Y direction are arranged in the X direction. In this case, FIG. 2 is a perspective view for illustrating the piezoelectric portion 14 of FIG. 1 as viewed from the upper side of the drawing sheet.

Voltages V1 to V4 are applied to the electrode portions 18a to 18d of the piezoelectric portions 14a to 14d, respectively. The voltages V1 to V4 are applied as square waves (pulse voltages). The piezoelectric element 16 is grounded from the elastic member 20.

The plus sign (+) illustrated in FIG. 2 indicates the polarization direction.

Figure 3:
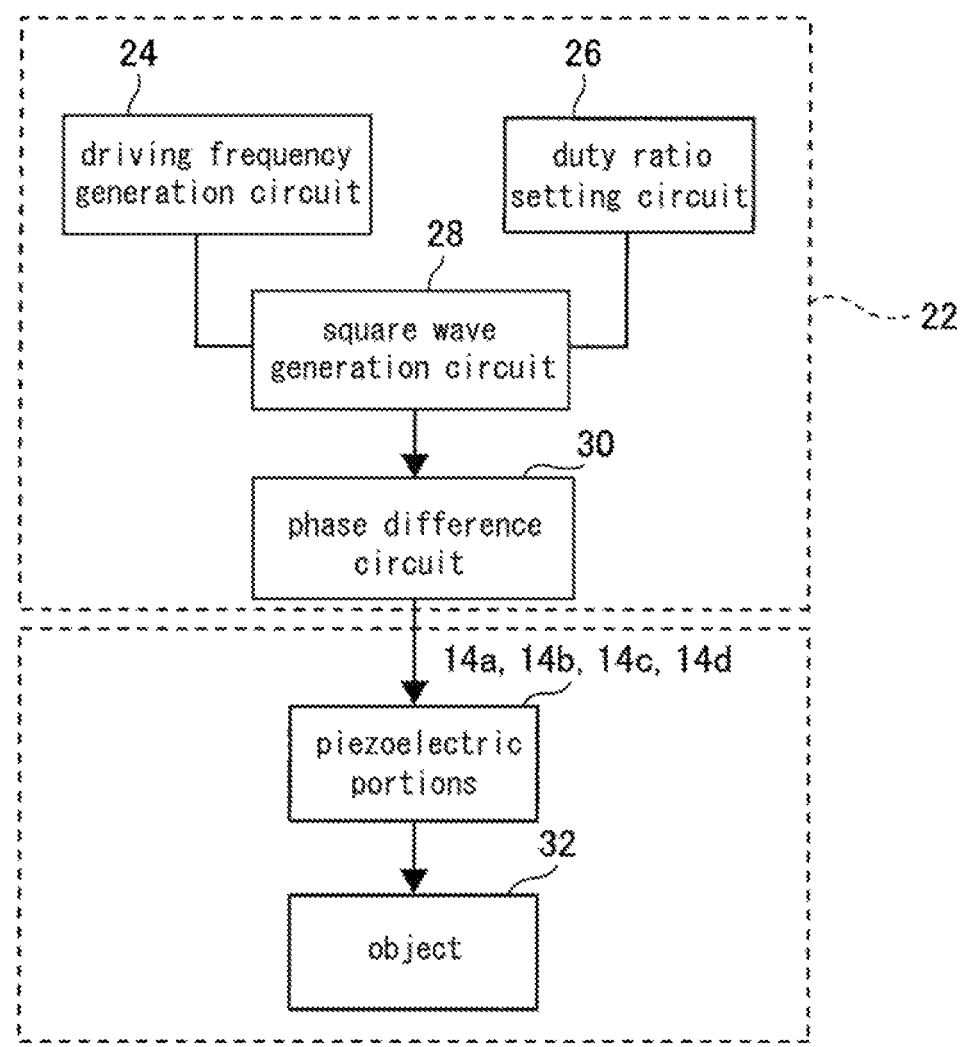
FIG. 3 is a block diagram for illustrating a controller of the piezoelectric driving device according to the first embodiment of the present invention.

FIG. 3 is an illustration of a controller 22 configured to control the piezoelectric portions 14a to 14d.

The controller 22 performs control with use of pulse width modulation (PWM), and includes a driving frequency generation circuit 24, a duty ratio setting circuit 26, a square wave generation circuit 28, and a phase difference circuit 30.

The driving frequency generation circuit 24 generates, for example, a triangle wave corresponding to a frequency. Further, the duty ratio setting circuit 26 sets a threshold value for the triangle wave generated by the driving frequency generation circuit 24. The square wave generation circuit 28 generates a square wave by outputting a power supply voltage when a voltage of the triangle wave generated by the driving frequency generation circuit 24 is higher than the threshold value of the duty ratio setting circuit 26.

The phase difference circuit 30 shifts a rise time and a fall time of each square wave so that the square waves to be applied to the piezoelectric portions 14a to 14d have phase differences.

The piezoelectric portions 14a to 14d oscillate when the voltages V1 to V4 are applied to the piezoelectric portions 14a to 14d, respectively, and thus the object 32 to be driven is driven via the driving portion 12 described above. The object 32 to be driven has an appropriate friction coefficient in a part to be brought into contact with the driving portion 12, and is made of a material having excellent abrasion resistance in this part.

As is well known, when the driving frequency and the duty ratio are adjusted, the piezoelectric portions 14a to 14d can induce sawtooth-wave oscillation displacement.

Figure 4:
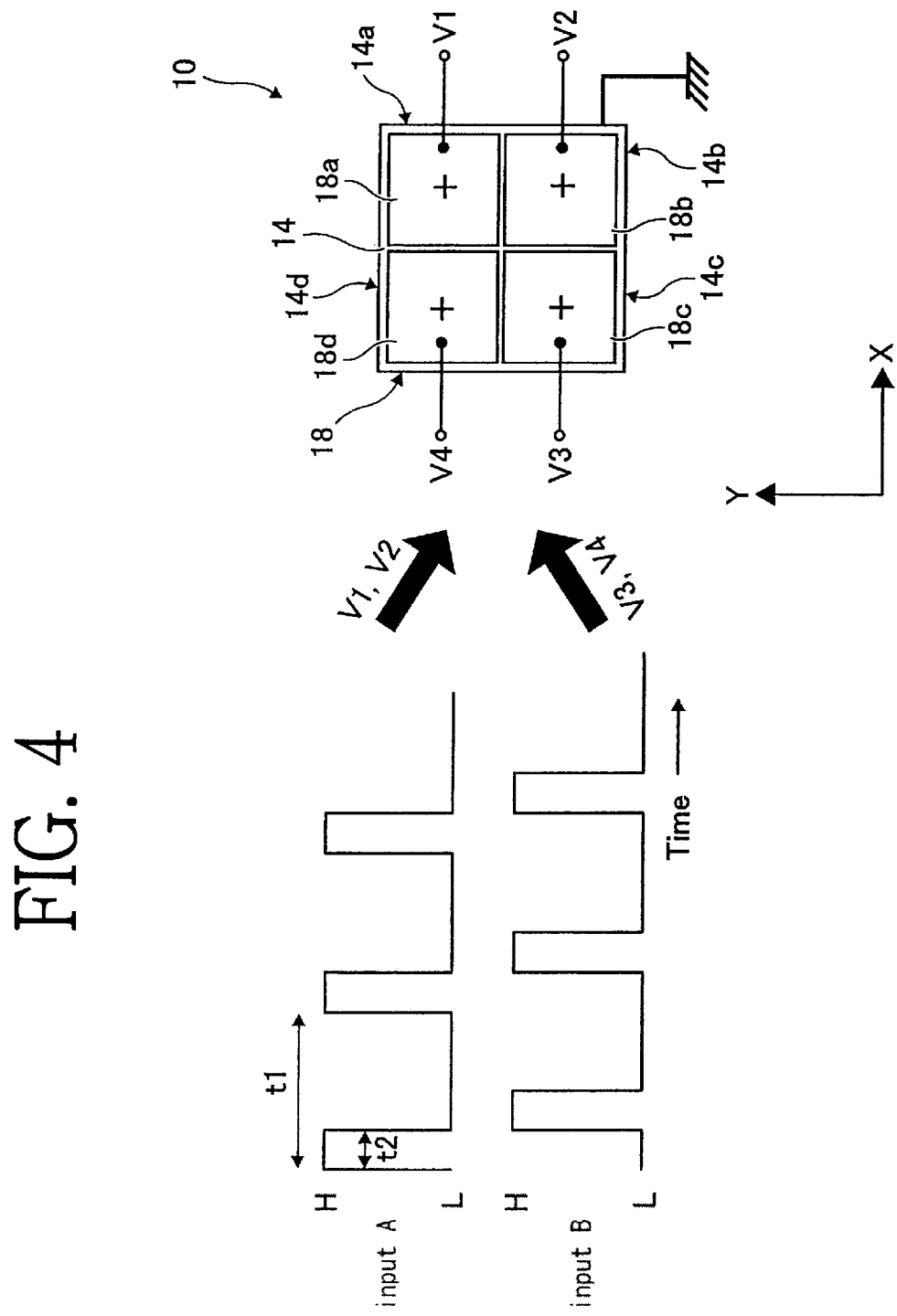
FIG. 4 is an explanatory diagram for illustrating an example in which voltages are applied to piezoelectric portions in the piezoelectric driving device according to the first embodiment of the present invention.

FIG. 4 is an illustration of an example of a method of applying the voltages V1 to V4 to the piezoelectric portions 14a to 14d, respectively.

Input A and input B are square wave voltages each having a duty ratio Du (t2/t1) of 30% and a driving frequency fd that is 0.7 time of a natural frequency fs of the piezoelectric portions 14a to 14d. The input B has a phase difference with respect to the input A in a direction with a delay of 90 degrees. In this case, the input A is applied to the piezoelectric portions 14a and 14b as V1 and V2. Meanwhile, the input B is applied to the piezoelectric portions 14c and 14d as V3 and V4.

Figure 5:
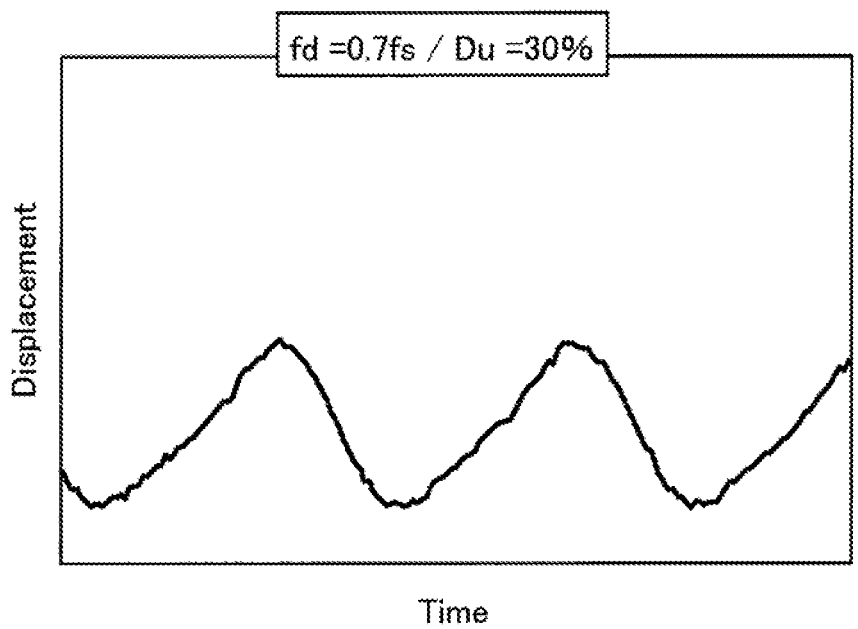
FIG. 5 is a graph for showing oscillation displacement of an object to be driven exhibited when a square wave voltage having a duty ratio of 30% and a frequency that is 0.7 time of a natural frequency fs is applied in the piezoelectric driving device according to the first embodiment of the present invention.

FIG. 5 is a graph for showing oscillation displacement of the object 32 to be driven exhibited when the square wave voltage having the duty ratio (t2/t1) of 30% and the driving frequency fd that is 0.7 time of the natural frequency fs of the piezoelectric portions 14a to 14d is applied. As is understood from FIG. 5, the oscillation displacement has a sawtooth-wave shape, in which the waveform rises gently and then falls steeply thereafter.

Figure 6A:
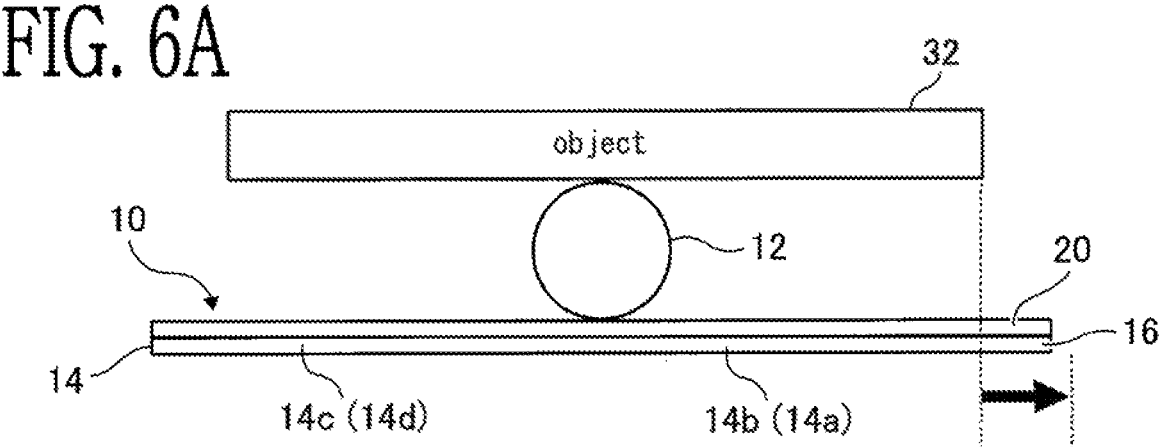
FIG. 6A, FIG. 6B, and FIG. 6C are side views for illustrating an operation example of the piezoelectric driving device according to the first embodiment of the present invention.
Figure 6B:
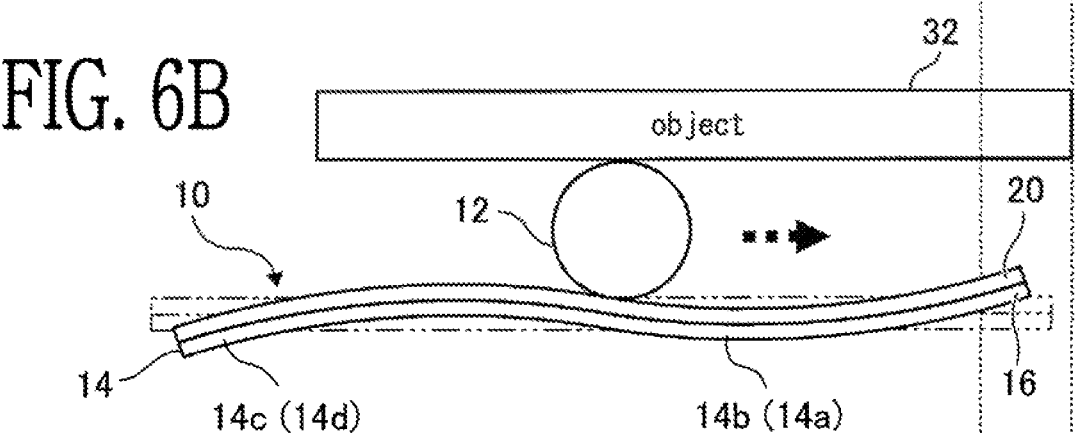
Figure 6C:
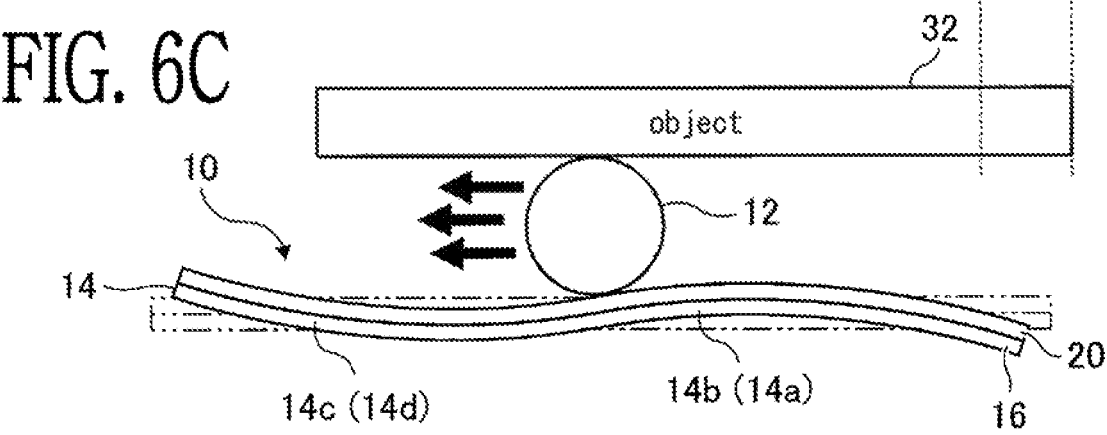

FIG. 6A to FIG. 6C are illustrations of an operation example of the piezoelectric driving device 10.

When no voltages are applied, the piezoelectric portions 14a to 14d have a planar shape as illustrated in FIG. 6A. In this case, when the input A (V1, V2) is applied to the piezoelectric portions 14a and 14b, as illustrated in FIG. 6B, the piezoelectric element 16 is expanded, but the elastic member 20 does not change. Therefore, the planar piezoelectric portions 14a and 14b are bent downward. Further, for simplicity, it is assumed that the input B (V3, V4) is applied to the piezoelectric portions 14c and 14d with a phase difference of 180 degrees. The piezoelectric element 16 is contracted, but the elastic member 20 does not change. Therefore, the planar piezoelectric portions 14c and 14d are similarly bent upward. In this case, the driving portion 12 is slowly inclined in a +X direction. When the driving portion 12 is slowly inclined in the +X direction, the object 32 to be driven in frictional contact with the driving portion 12 follows the driving portion 12 due to a frictional force to move in the +X direction.

Next, as illustrated in FIG. 6C, the piezoelectric portions 14a to 14d are bent to opposite sides, and thus the driving portion 12 attempts to rapidly return in a −X direction, which is the opposite direction. That is, the driving portion 12 attempts to rapidly incline in the −X direction. When the driving portion 12 rapidly returns, the object 32 to be driven attempts to stay in its place due to an inertial force. With the series of operations, the object 32 to be driven is slightly moved in the +X direction. When this operation is repeated, the object 32 to be driven can be driven in the +X direction.

When the object 32 to be driven is to be driven in a +Y direction, the input A may be applied to the piezoelectric portions 14a and 14d forming one pair, and the input B may be applied to the piezoelectric portions 14b and 14c forming another pair. Therefore, when the driving in the X direction and the driving in the Y direction are alternately repeated, the object 32 to be driven can be driven also in an oblique direction.

Figures 7, 8:
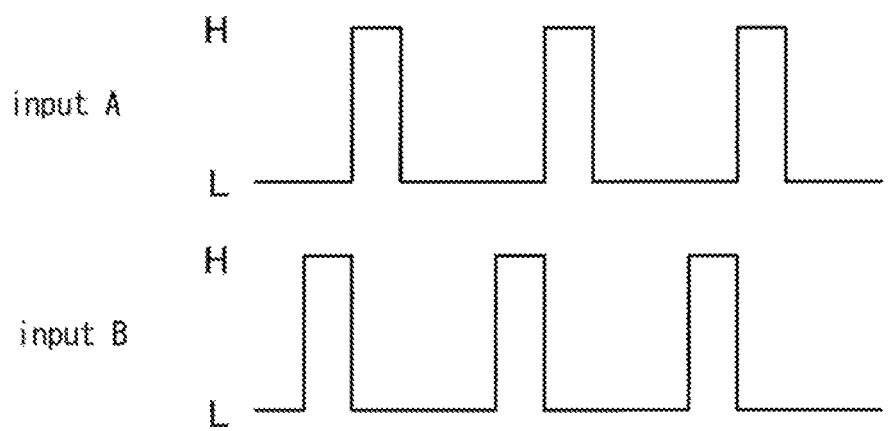
FIG. 7 is a waveform chart for illustrating a case in which input B has a phase difference of 270 degrees with respect to input A in the piezoelectric driving device according to the first embodiment of the present invention.
FIG. 8 is a table for collectively showing control examples of the piezoelectric driving device according to the first embodiment of the present invention.

Further, as illustrated in FIG. 4, when the input B has a phase delay of 90 degrees with respect to the input A, the piezoelectric portions 14c and 14d are moved so as to follow the motions of the piezoelectric portions 14a and 14b later, and thus the object 32 to be driven can be driven in the +X direction. Similarly, the object 32 to be driven can be driven in the +Y direction. As illustrated in FIG. 7, when the input B has a phase difference of 270 degrees with respect to the input A, the driving portion 12 can be moved gently and rapidly with respect to the object 32 to be driven in directions opposite to those in the case of 90 degrees. Thus, the object 32 to be driven can be driven in the −X direction or a −Y direction.

When the above-mentioned operations are summarized, as shown in FIG. 8, the object 32 to be driven can be driven in the ±X directions and the ±Y directions by controlling targets of the piezoelectric portions 14a to 14d to which the voltages V1 to V4 are to be applied and the phase differences thereof.

The numerals in the parentheses indicate the phase difference exhibited when the driving is performed in the opposite direction.

Figure 9A:
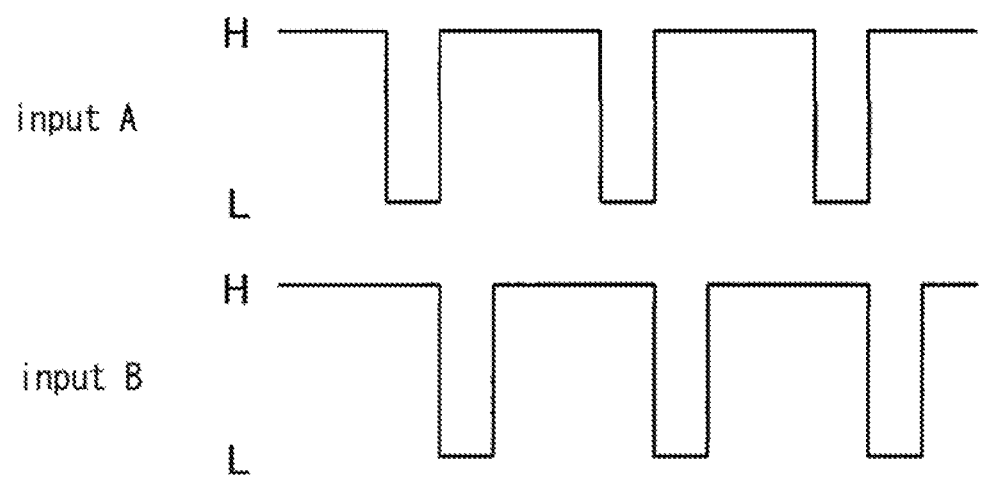
FIG. 9A and FIG. 9B are waveform charts for illustrating a case in which the duty ratio is set to 70% in the piezoelectric driving device according to the first embodiment of the present invention.
Figure 9B:
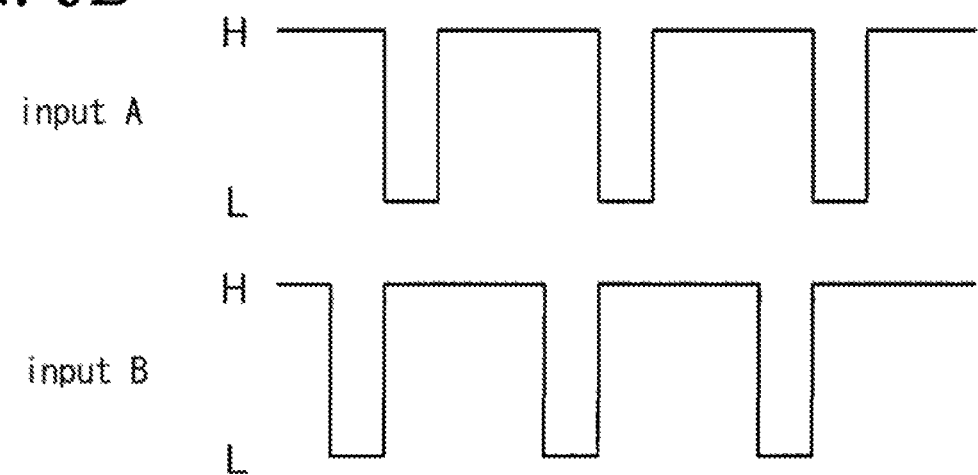
Figure 10:
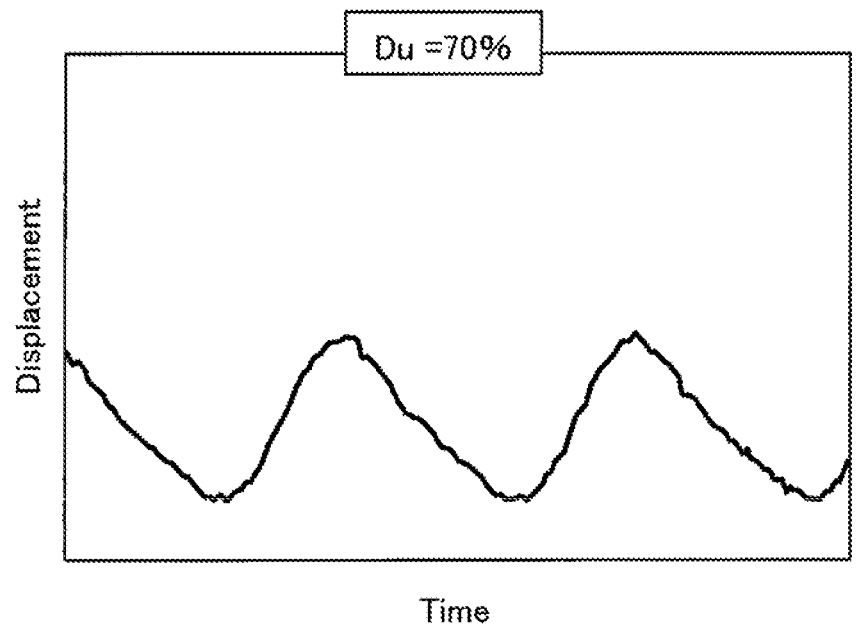
FIG. 10 is a graph for showing oscillation displacement of the object to be driven when a square wave voltage having a duty ratio of 70% and a frequency that is 0.7 time of the natural frequency fs is applied in the piezoelectric driving device according to the first embodiment of the present invention.

In the above-mentioned first embodiment, the driving direction is switched from the +X direction or the +Y direction to the −X direction or the −Y direction with use of the phase difference, but the present invention is not limited thereto. The driving direction can be switched by switching, for example, the duty ratio. That is, as illustrated in FIG. 9A and FIG. 9B, when the duty ratio is set to 70%, the object 32 to be driven can have such oscillation displacement as shown in FIG. 10, in which the steep and gentle parts are reversed so that the rising is steep and the falling is gentle. Therefore, the object 32 to be driven is driven in the opposite direction as compared to the case in which the duty ratio is 30%.

The piezoelectric driving device 10 according to the first embodiment has been treated as a piezoelectric driving device including the driving portion 12 to be brought into frictional contact with the object to be driven, and the four piezoelectric portions 14a to 14d, which are fixed to the driving portion 12, are arranged in a circulated manner on a plane and around the driving portion 12, and are configured to be bent with respect to the plane when voltages are supplied thereto. However, for example, the piezoelectric portions 14a and 14b can be considered as one piezoelectric portion, and the piezoelectric portions 14c and 14d can be considered as another piezoelectric portion. In this case, the piezoelectric driving device 10 can be also considered as including the driving portion 12 to be brought into frictional contact with the object to be driven, and two piezoelectric portions, which are fixed to the driving portion 12, are arranged on a plane with the driving portion 12 being sandwiched between the two piezoelectric portions, and are configured to be bent with respect to the plane when voltages are applied thereto.

Figure 11:
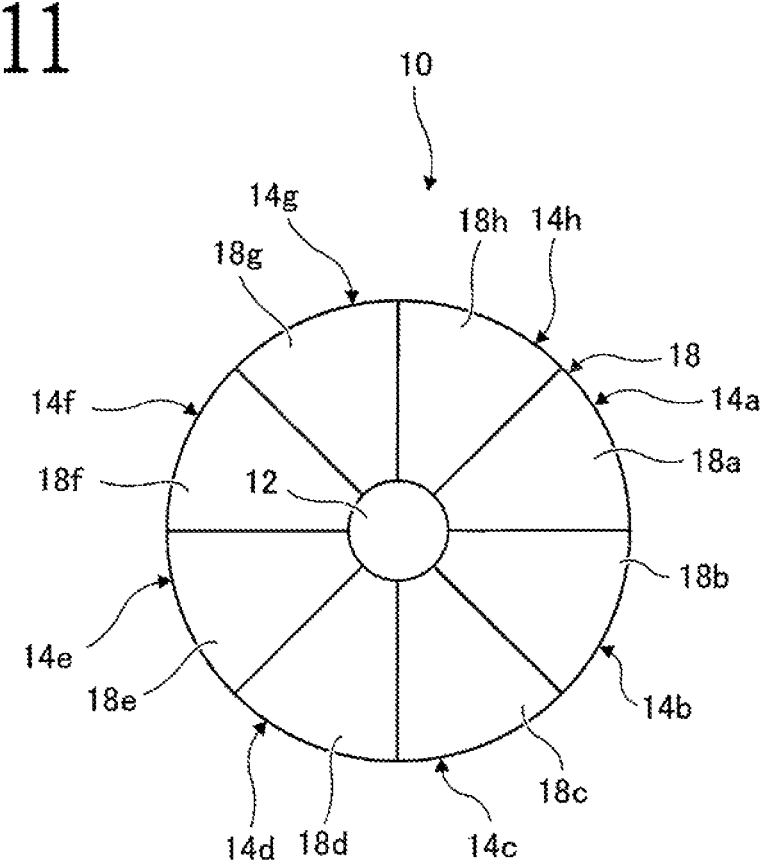
FIG. 11 is a plan view for illustrating a piezoelectric driving device according to a second embodiment of the present invention.

FIG. 11 is an illustration of a piezoelectric driving device 10 according to a second embodiment of the present invention.

In the second embodiment, the piezoelectric driving device 10 is formed into a disc shape, and the electrode 18 is divided into eight electrode portions 18a to 18h so that the piezoelectric driving device 10 includes eight piezoelectric portions 14a to 14h. In the second embodiment, pulse voltages having a phase difference may be applied to opposing electrodes, for example, the electrode portion 18a and the electrode portion 18e, or pulse voltages having a phase difference may be applied to the electrode portions 18a to 18d and the electrodes 18e to 18h. According to the second embodiment, as compared to the above-mentioned first embodiment, the direction to drive the object to be driven can have a higher degree of freedom.

Figure 12:
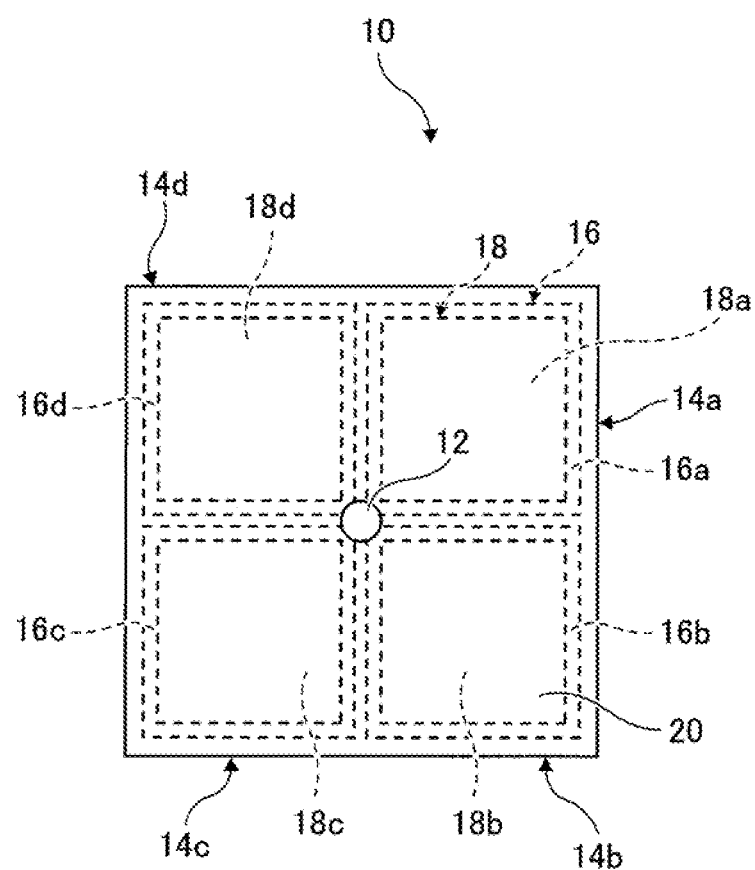
FIG. 12 is a plan view for illustrating a piezoelectric driving device according to a third embodiment of the present invention.

FIG. 12 is an illustration of a piezoelectric driving device 10 according to a third embodiment of the present invention.

The third embodiment differs from the above-mentioned first embodiment in that the piezoelectric element 16 is divided. That is, the piezoelectric element 16 is divided into four piezoelectric element portions 16a to 16d so as to correspond to the respective electrode portions 18a to 18d of the electrode 18. The piezoelectric element portions 16a to 16d have outer shapes that are slightly larger than those of the electrode portions 18a to 18d. The piezoelectric element portions 16a to 16d may be brought into contact with one another, but are preferred to be separated from one another by about several tens of micrometers. When the piezoelectric element 16 is divided as described above, there is no interference except the elastic member 20 among the piezoelectric element portions 16a to 16d, and hence the piezoelectric element 16 can be freely moved.

As illustrated in FIG. 12, the elastic member 20 may be larger than the piezoelectric element 16.

Figure 13:
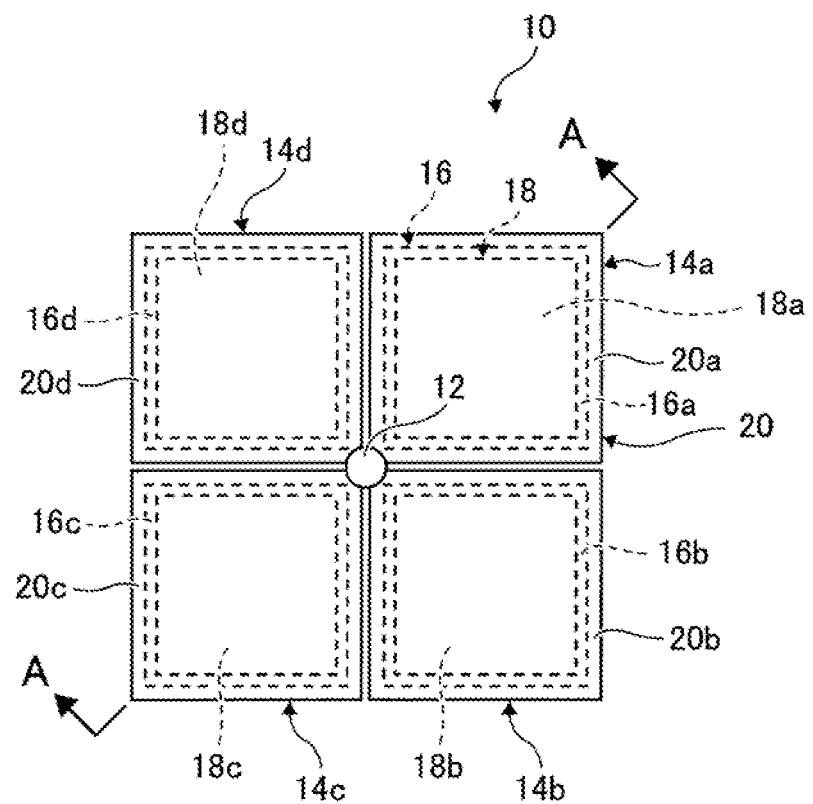
FIG. 13 is a plan view for illustrating a piezoelectric driving device according to a fourth embodiment of the present invention.
Figure 14:
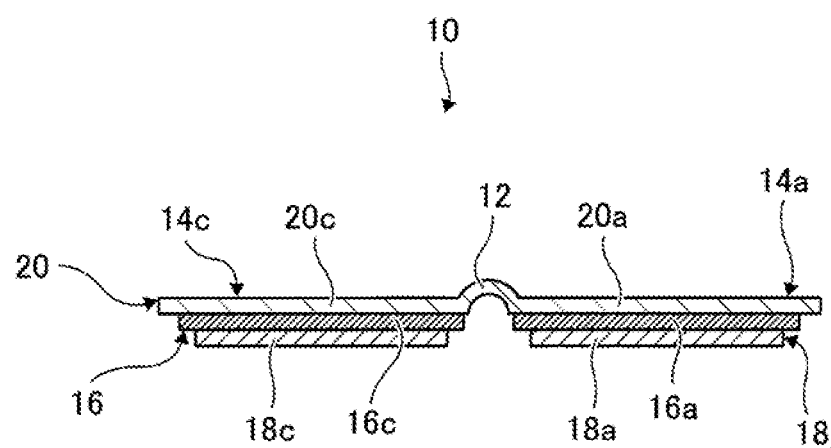
FIG. 14 is a sectional view for illustrating the piezoelectric driving device according to the fourth embodiment of the present invention, which is taken along the line A-A of FIG. 13.

FIG. 13 and FIG. 14 are illustrations of a piezoelectric driving device 10 according to a fourth embodiment of the present invention.

The fourth embodiment, differs from the above-mentioned third embodiment in that the elastic member 20 is also divided. That is, the elastic member 20 is divided into four elastic member portions 20a to 20d so as to correspond to the respective piezoelectric element portions 16a to 16d of the piezoelectric element 16 and the respective electrode portions 18a to 18d of the electrode 18. The four divided elastic member portions 20a to 20d are coupled to one another by the driving portion 12 provided at the center. The driving portion 12 is formed integrally with the elastic member portions 20a to 20d, and is protruded in a semispherical manner. A leading end of the driving portion 12 abuts against the above-mentioned object 32 to be driven. As compared to the third embodiment, the fourth embodiment can further reduce the interference among the piezoelectric element portions 16a to 16d.

As described above, there are arranged two piezoelectric portions 14a (14b) and 14c (14d), which are arranged on a plane with the driving portion 12 being sandwiched therebetween, and are configured to be bent with respect to the plane when voltages are applied thereto. Therefore, the object 32 to be driven in frictional contact with the driving portion 12 can be driven only by one-direction oscillation mode. Further, the four piezoelectric portions 14a to 14d are arranged in a circulated manner on a plane and around the driving portion 12, and hence the object 32 to be driven in frictional contact with the driving portion 12 can be driven in two directions. The object 32 to be driven in the above-mentioned embodiments may be an optical member. For example, the present invention may be embodied as an optical member driving device in which a lens member or an image sensor is driven in the XY directions so that image stabilization can be achieved. The present invention may also be embodied as a camera device having the optical member driving device mounted thereon, or an electronic apparatus including the camera device, for example, a cell phone or a smart phone.

What is claimed is:

1. A piezoelectric driving device, comprising:
   a driving portion to be brought into frictional contact with an object to be driven; and
   at least two piezoelectric portions, which are provided to the driving portion, are arranged on a plane with the driving portion being sandwiched between the at least two piezoelectric portions, and are configured to be bent with respect to the plane when voltages are applied to the at least two piezoelectric portions.

2. A piezoelectric driving device according to claim 1, the at least two piezoelectric portions are four piezoelectric portions, which are arranged in a circulated manner on the plane and around the driving portion.

3. A piezoelectric driving device according to claim 1 wherein the driving portion is configured to be inclined in a reciprocating manner along a direction in which the two piezoelectric portions are arranged, and has different inclination speeds between a forward path and a return path.

4. A piezoelectric driving device according to claim 1, wherein the two or four piezoelectric portions include a plate-like piezoelectric element, a plate-like elastic member fixed to one surface of the plate-like piezoelectric element, and an electrode fixed to another surface of the plate-like piezoelectric element on an opposite side to the one surface, and
   wherein the electrode is divided into one of two electrodes and four electrodes.

5. A piezoelectric driving device according to claim 4, wherein the plate-like piezoelectric element is divided so as to correspond to the divided electrode.

6. A piezoelectric driving device according to claim 5,
   wherein the plate-like elastic member includes elastic member portions divided so as to correspond to the divided electrode and the divided plate-like piezoelectric element, and
   wherein the elastic member portions are connected to each other via the driving portion.

7. A piezoelectric driving device according to claim 2, wherein two of the four piezoelectric portions are arranged in each of an X direction corresponding to one direction and a Y direction, which is orthogonal to the X direction.

8. A piezoelectric driving device according to claim 1, further comprising a controller configured to control driving of the two or four piezoelectric portions by applying pulse voltages to the two or four piezoelectric portions.

9. A piezoelectric driving device according to claim 8, wherein the controller is configured to control a phase difference of the pulse voltages to be applied to the two or four piezoelectric portions.

10. A piezoelectric driving device according to claim 8, wherein the controller is configured to control a duty ratio of the pulse voltages to be applied to the two or four piezoelectric portions.

11. A piezoelectric driving device according to claim 8, wherein the controller is configured to control a frequency of the pulse voltages to be applied to the two or four piezoelectric portions so that the frequency has a predetermined relationship with respect to a natural frequency.

12. A piezoelectric driving device according to claim 7,
    wherein, when the object to be driven is to be moved in the X direction, pulse voltages are applied with a phase difference to two pairs each including the two of the four piezoelectric portions arranged in the Y direction, and
    wherein, when the object to be driven is to be moved in the Y direction, the pulse voltages are applied with the phase difference to two pairs each including the two of the four piezoelectric portions arranged in the X direction.

13. A piezoelectric driving device according to claim 12, wherein, when movement of the object to be driven is switched between a positive direction and a negative direction of one of the X direction and the Y direction, the phase difference of the pulse voltages to be applied to the two or four piezoelectric portions is switched.

14. A piezoelectric driving device according to claim 12, wherein, when movement of the object to be driven is switched between a positive direction and a negative direction of one of the X direction and the Y direction, a duty ratio of the pulse voltages to be applied to the two or four piezoelectric portions is switched.

15. An optical member driving device, comprising the piezoelectric driving device of claim 1,
    wherein the object to be driven includes an optical member.

16. A camera device, comprising the optical member driving device of claim 15.

17. An electronic apparatus, comprising the camera device of claim 16.

* * * * *